United States Patent
Bognar

(10) Patent No.: US 8,032,862 B2
(45) Date of Patent: *Oct. 4, 2011

(54) DYNAMIC CONFIGURATION FILES

(75) Inventor: James I. Bognar, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 726 days.

This patent is subject to a terminal disclaimer.

(21) Appl. No.: 12/166,912

(22) Filed: Jul. 2, 2008

(65) Prior Publication Data

US 2008/0263519 A1    Oct. 23, 2008

Related U.S. Application Data

(63) Continuation of application No. 11/022,718, filed on Dec. 27, 2004, now Pat. No. 7,412,691.

(51) Int. Cl.
*G06F 9/44* (2006.01)
(52) U.S. Cl. ......... 717/121; 717/169; 717/170; 707/600
(58) Field of Classification Search .................. 717/121, 717/168–178; 707/600
See application file for complete search history.

(56) References Cited

U.S. PATENT DOCUMENTS

| | | | | |
|---|---|---|---|---|
| 5,247,683 | A * | 9/1993 | Holmes et al. | 709/221 |
| 6,151,605 | A * | 11/2000 | Costa | 717/163 |
| 7,031,972 | B2 * | 4/2006 | Ren et al. | 707/621 |
| 7,155,708 | B2 * | 12/2006 | Hammes et al. | 717/155 |
| 2002/0178233 | A1 * | 11/2002 | Mastrianni et al. | 709/217 |
| 2005/0198652 | A1 * | 9/2005 | Huscher et al. | 719/331 |

FOREIGN PATENT DOCUMENTS

| | | | |
|---|---|---|---|
| JP | 04-242858 | * | 8/1992 |
| JP | 09-185495 | * | 7/1997 |
| JP | 2002-222104 | * | 8/2002 |

OTHER PUBLICATIONS

Warren, I.; Sommerville, I.; A model for dynamic configuration which preserves application integrity; IEEE, 1996, pp. 81-88.*
Kim, K.H.; Subbaraman, C.; Dynamic configuration management in reliable distributed real-time information systems; vol. 11 Issue: 1, IEEE, 1999, pp. 239-254.*
Misra, A.; Das, S.; McAuley, A.; Das, S.K.; Autoconfiguration, registration, and mobility management for pervasive computing; vol. 8 Issue: 4, 2001, pp. 24-31.*
Wai-Leung Cheung; Fung, Y.F.; Weizhao Wang; Chan, T.M.; Automatic device configuration and data validation through mobile communication; Computers and signal Processing, 2003. PACRIM. 2003 IEEE Pacific Rim Conference on vol. 1 Aug. 28-30, 2003, pp. 284-287 vol. 1.*

* cited by examiner

*Primary Examiner* — Wei Zhen
*Assistant Examiner* — Satish Rampuria

(57) ABSTRACT

A dynamic nature is added to configuration files so that various types of dynamic functions can be performed within them. Variables are utilized within the configuration files. Thus, it is possible to have parameters specified in one configuration file and a formula to which the parameters will be applied in another configuration file. This allows changing of the values in the parameter file without having to modify the formula file, thereby streamlining the modification process when changes need to be made. In addition, it provides the capability for cross-referencing between configuration properties by allowing for variables in properties that refer to other properties.

13 Claims, 1 Drawing Sheet

DYNAMIC CONFIGURATION FILES

CROSS-REFERENCE TO RELATED APPLICATIONS

This is a continuation of U.S. application Ser. No. 11/022,718, filed Dec. 27, 2004, the entire contents of which are hereby incorporated by reference.

BACKGROUND OF THE INVENTION

1. Field of the Invention

This invention relates to data processing systems, methods, and computer program products, and more particularly to configuration files for data processing systems, methods, and computer program products.

2. Description of the Related Art

A given data processing system may be configured in many ways. Some of the configuration options are set by varying the hardware (e.g., number and capacity of disk drives). Other configuration parameters are set within configuration files stored by the computer.

Software programs typically use configuration files of one kind or another to define customizable properties. One very common configuration file format, used by "INI" files on the Windows operating system, divides configuration properties into sections, as follows:

property1=value1
[section2]
property1=value1
property2=value2

Configuration files are typically used because they can be edited using a simple text editor, thereby enabling end-users to easily make changes to them. Therefore, their use has become pervasive in application development. Some examples of properties that are often stored in configuration files include user-interface related information, such as colors, font types, font sizes, etc.; prerequisite software locations, versions, and related information; and debug settings.

Typical configuration files are static in nature (i.e. properties are only simple textual strings that contain no variables). This static nature of configuration files renders their use suboptimal in some circumstances. When defining locale-specific values, multiple configuration files need to be created when a particular property needs to vary from one locale to the next. For example, situations arise when it is desired to define different font-types or font-sizes depending on the locale (e.g., a Japanese-language font versus an English-language font). Using typical configuration files in multi-language development, this could be accomplished by creating separate configuration files for each locale, or having the end-user manually update these fields to match the settings for the desired locale. Either process (separate configuration files or manual updating) are tedious and time-consuming.

Another situation where the static nature of configuration files is not adequate occurs when a property in one configuration file needs to reference a second property in the same or different configuration file. For example, many applications define properties for directories used by an application (e.g. where to put log files, where to find libraries, etc.). Often these directories are located inside the 'install' directory by default, but are exposed to the end-user so that these directories can be modified at a later date. Using typical configuration files, each of these dependent properties have to be defined separately, as follows:

[Paths]
installDir=C:\Program Files\My Product
logDir=C:\Program Files\My Product\logs
libDir=C:\Program Files\My Product\lib Unfortunately, if the install location changes (e.g., if the install directory changes from "My Product" to "Their Product"), each property containing the install location (e.g., "logs" and "lib" in the above example) must also be updated. This can be particularly tedious if these dependent properties are scattered throughout the configuration file, or even defined in different configuration files.

Accordingly, it would be desirable to have the ability to include dynamic elements in configuration files and then resolve the variables when the configuration files are run.

SUMMARY OF THE INVENTION

The present invention adds a dynamic nature to configuration files so that various types of dynamic functions can be performed within them. Variables are utilized within the configuration files. Using the present invention, it is possible to have parameters specified in one configuration file and a formula to which the parameters will be applied in another configuration file. This allows changing of the values in the parameter file without having to modify the formula file, thereby streamlining the modification process when changes need to be made. In addition, it provides the capability for cross-referencing between configuration properties by allowing for variables in properties that refer to other properties.

DETAILED DESCRIPTION OF THE PREFERRED EMBODIMENTS

Figure 1:
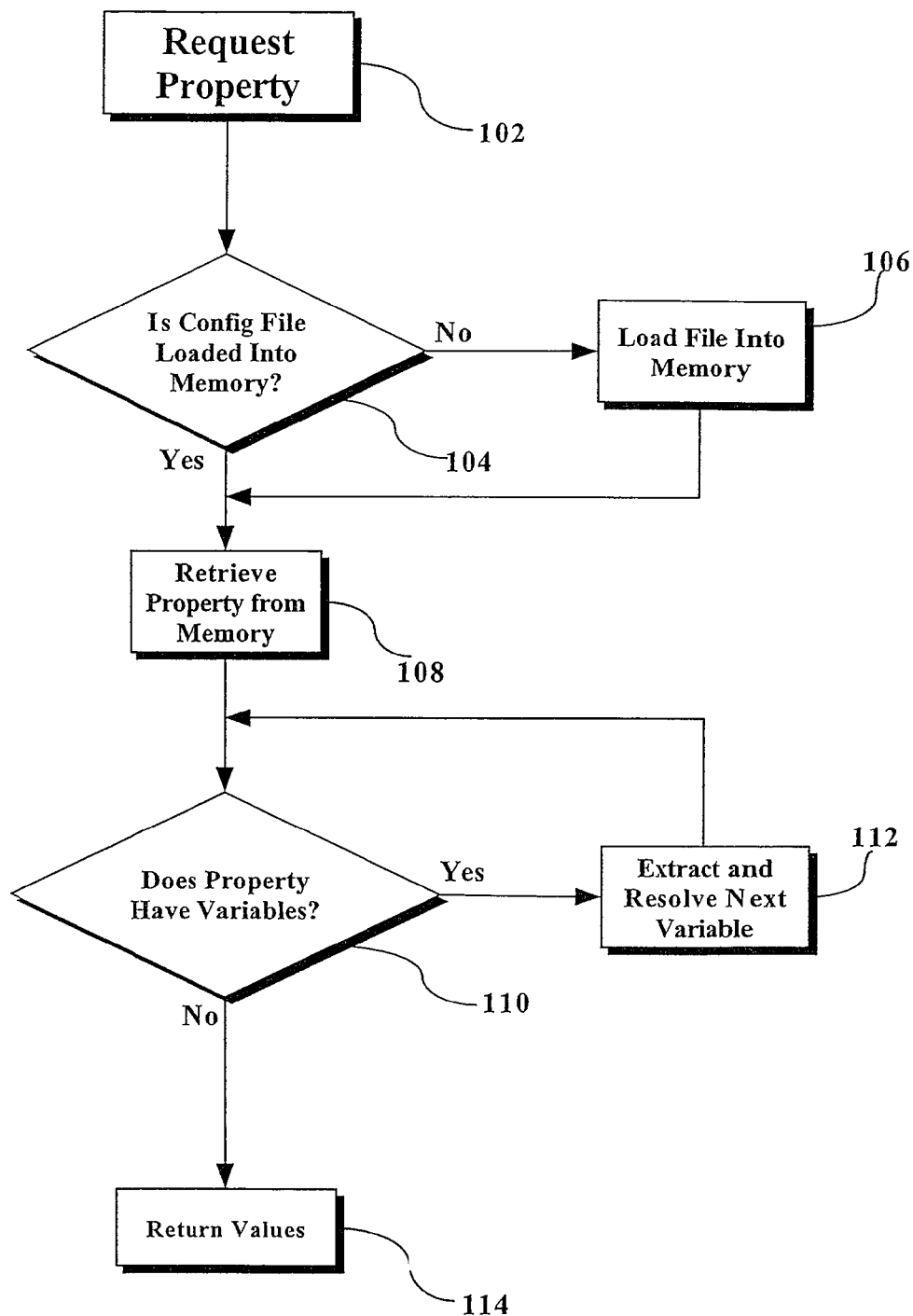
FIG. 1 illustrates the steps performed in accordance with the present invention.

FIG. 1 illustrates the steps performed in accordance with the present invention. As an initial matter, configuration files must either exist or be created that comprise configuration properties having one or more variables of the format "$x{y}, where the "x" portion of the variable is a primary variable comprising one or more letters, and the "y" portion comprises a string that itself can contain one or more variables of the same format (i.e., recursively nested variables) (e.g., "$x{$x{y}}", "$x{$x{y} $x{y}}", "$x{$x{$x{y}}}", etc). Creation of these variables is a relatively simple matter involving merely the use of a text editor to place, for example, $C,$L,$MB variables, etc.

Configuration files are accessed through "keys" of the format "config.section.name" that identify the configuration file name (without the *.cfg extension), section name in the file, and property name in the section, respectively. Either all configuration files can be located in the same directory, or else a "path" can be defined that specifies all directories containing all configuration files.

FIG. 1 describes the process of retrieving a property from a configuration file. At step 102, an external program requests the value of a configuration property by passing in a configuration 'key' of the format 'config.section.name' (e.g. 'MyConfig.MySection.myVal'). At step 104, the configuration key is parsed, and the process checks to see if the configuration file identified by the 'config' part of the key has been loaded into memory (e.g. 'MyConfig.cfg').

At step 106, the configuration file is loaded into memory. This consists of reading all properties in the configuration file and storing them in memory. At step 108, the property value associated with the key is retrieved from memory. At step 110, the property value is checked to see if it has a variable in it by looking for the string pattern '$x{y}', where x consists of one or more letters, and y consists of a string with zero or more recursively nested variables. At step 112, the variable is extracted from the property string. If the 'y' portion of the variable contains recursively nested variables, then these are recursively resolved until the 'y' portion of the variable contains no variables. Then a variable-resolver (described in more detail below) associated with the string 'x' is used to resolve the value of the variable as plain text. This plain text value is then reinserted into the original property string, overwriting the previous variable. This process is repeated until all variables in the property are resolved to plain text.

At step 114, the resulting plain-text property and returned to the external program. Optionally, the resolved property value can be stored in memory in place of the previous value in memory so that subsequent property retrievals do not have to re-resolve the variables.

The variable-resolver is a construct that accepts input text, and returns output text relevant to the input text passed in. In the Java™ programming language, this can be accomplished by implementing classes of the following interface:

```
public interface Var {
    public String resolve(String arg);
}
Each variable type defined in a configuration file must have
an associated variables resolver (e.g.
$C{y}CVar, $L{y}LVar, etc.).
```

The following variables have been defined that implement the dynamic nature in the configuration files.

$C{Config.Section.Name}—Implements the cross-referencing capabilities between configuration properties. The value of 'Config.Section.Name' is passed to the process defined in FIG. 1 to resolve the value of the specified property.

$L{ResourceBundleProperty}—Implements internationalization support. The value of 'ResourceBundleProperty' refers to a property defined in a Java™ resource bundle.

$MB {expression}—Implements Boolean math support. The value of 'expression' is a Boolean mathematical expression, and the $MB variable resolves to the strings 'true' or 'false'. Example: $MB {(1>2.parallel.3<4) & false} 'false'

$MI{expression}—Implements integer math support. The value of 'expression' is a mathematical expression, and the $MI variable solves that expression and returns the resulting integer as a string. Example: $MI{1+2*3} '7'

$MF{expression}—Implement float math support. The value of 'expression' is a mathematical expression, and the $MF variables solves that expression and returns the resulting float values as a string. Example: $MF{3/(1+1)} '1.5'

The flow of the process described in FIG. 1, known as the method "ConfigMgr.get( )", is as follows:
1. User calls ConfigMgr.get ("MyConfig1.MySection1.myVar1").
2. ConfigMgr parses key.
3. ConfigMgr looks for file MyConfig1.cfg in internal cache. If not found in the internal cache, then the file is loaded into the internal cache.
4. ConfigMgr looks for MySection1 in MyConfig1.
5. ConfigMgr looks for myVar1 in MySection1.
6. ConfigMgr retrieves the value for myVar1 from memory and puts the value in VALUE.
7. ConfigMgr calls VALUE=ConfigMgr.resolve(VALUE).
8. ConfigMgr returns VALUE.

The flow of ConfigMgr.resolve(X) is as follows:

1. Looks for existence of first $_{ } variable. If none exist, returns X.
2. Get contents of body of variable (i.e. $C {<body of variable>}) and puts it in BODY.
3. Calls BODY=ConfigMgr.resolve(BODY) to recursively resolve any internal variables.
4. Depending on the variable . . .

```
If ($C) {
    calls CVar.resolve(BODY), and replaces $C variable in X
    with the results.
} else if ($L) {
    calls LVar.resolve(BODY), and replaces $L variable in X
    with the results.
} else if ($MB) {
    calls MBVar.resolve(BODY), and replaces $MB variable in
    X with the results.
} else if ($MI) {
    calls MIVar.resolve(BODY), and replaces $MI variable in
    X with the results.
} else if ($MF) {
    calls MFVar.resolve(BODY), and replaces $MF variable in
    X with the results.
}
```

5. Go to step 1.

Passwords can also be stored, using the present invention, in dynamic configuration files thereby resulting in a reduced security risk. Using the present invention for password encoding functions as follows. If a "*" is added to the end of a property name in a configuration file, the value becomes encoded the first time the file is encountered through the ConfigMgr utility. Thus, if a file appears as follows:
[database]
username=me
password*=mypassword
then the first time the file is loaded by the process, the value is immediately encoded and the configuration file is updated, as follows:
[database]
username=me
password*={xor}OS1sdjE7MyY=
The characters that follow the "{xor}" represent the encoded string representing the password. Encoding is a two-way process. If the algorithm used to encode the value is known, then it can also be decoded to get the original value. Therefore, if an encoded value is read from a configuration file, the original value can be determined.

The process proceeds as follows. First, an asterisk is added to the end of the property name of the property to be encoded. Next, when the file gets loaded into memory (see step 106 in FIG. 1), each property name is checked to see if any of them ends in the "*" character. For each property with an "*" character, if the property value has been previously encoded (i.e., the value starts with "{xor}") then the value is decoded as it is loaded into memory (the configuration file is unchanged). If the property value has not been previously encoded (i.e., the value does not start with "{xor}"), then the property value in the configuration file is immediately overwritten with an encoded string. Any algorithm can be used to encode the string.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a computer system. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A system of returning dynamic results from the processing of a configuration file by a processor, said processor including a memory, comprising:
   means for loading into memory a configuration file comprising configuration properties having one or more variables;
   means for resolving the variables of the configuration properties; and
   means for replacing each variable with the results of its respective resolving step;
   wherein said means for resolving includes, for each configuration property:
   means for detecting each variable in said configuration property;
   means for resolving any recursive variables in said configuration property before resolving a primary variable in said configuration property; and
   means for resolving said primary variable; and
   wherein said means for resolving executes when an external program attempts to access any configuration properties containing variables.

2. The system of claim 1, wherein said means for resolving use a variable resolver to perform the resolving process.

3. The system of claim 1, wherein said variables being resolved comprise variables of the format "file.section.property" which identify additional configuration properties.

4. The system of claim 1, wherein said variables being resolved comprise boolean expressions.

5. The system of claim 1, wherein said variables being resolved comprise integer math expressions.

6. The system of claim 1, wherein said variables being resolved comprise float math expressions.

7. The system of claim 1, wherein said variables being resolved comprise resource bundle properties.

8. A computer program product for returning dynamic results from the processing of a configuration file by a processor, said processor including a memory, the computer program product comprising a computer-readable storage medium having computer-readable program code embodied in the medium, the computer-readable program code comprising:
   computer-readable program code that loads into memory a configuration file comprising configuration properties having one or more variables;
   computer-readable program code that resolves the variables of the configuration properties; and
   computer-readable program code that replaces each variable with the results of its respective resolving step;
   wherein said computer-readable program code that resolves the variable of the configuration property includes, for each configuration property:
   computer-readable program code that detects each variable in said configuration property;
   computer-readable program code that resolves any recursive variables in said configuration property before resolving a primary variable in said configuration property; and
   computer-readable program code that resolves said primary variable;
   wherein said computer-readable program code that resolves the variable of the configuration property is executed when an external program attempts to access any configuration properties containing variables.

9. The computer program product of claim 8, wherein said computer-readable program code that resolves the variable of the configuration property uses a variable resolver to perform the resolving process.

10. The computer program product of claim 8, wherein said variables being resolved comprise variables of the format "file.section.property" which identify additional configuration properties.

11. The computer program product of claim 8, wherein said variables being resolved comprise integer math expressions.

12. The computer program product of claim 8, wherein said variables being resolved comprise float math expressions.

13. The computer program product of claim 8, wherein said variables being resolved comprise resource bundle properties.

* * * * *